United States Patent
Cho

(10) Patent No.: US 7,805,814 B2
(45) Date of Patent: Oct. 5, 2010

(54) RATCHET-HEAD CONDUCTOR LOCKING MEDIUM VOLTAGE POLYMER INSULATOR CABLE SUPPORT HANGER MOUNT

(75) Inventor: May K. Cho, Sudbury, MA (US)

(73) Assignee: Marmon Utility LLC, Milford, NH (US)

( * ) Notice: Subject to any disclaimer, the term of this patent is extended or adjusted under 35 U.S.C. 154(b) by 337 days.

(21) Appl. No.: 12/035,870

(22) Filed: Feb. 22, 2008

(65) Prior Publication Data

US 2008/0203243 A1 Aug. 28, 2008

Related U.S. Application Data

(60) Provisional application No. 60/891,149, filed on Feb. 22, 2007.

(51) Int. Cl.
*B65D 67/02* (2006.01)
(52) U.S. Cl. .......................... 24/16 PB; 248/62; 248/63; 248/74.3
(58) Field of Classification Search .................... 248/62
See application file for complete search history.

(56) References Cited

U.S. PATENT DOCUMENTS

| | | | | |
|---|---|---|---|---|
| 3,517,702 A | * | 6/1970 | Trimble et al. .............. | 138/128 |
| 3,913,187 A | * | 10/1975 | Okuda ......................... | 24/484 |
| 4,439,896 A | * | 4/1984 | Matsui ..................... | 24/16 PB |
| D307,541 S | * | 5/1990 | Tres ............................ | D8/396 |
| 5,305,978 A | * | 4/1994 | Current .................... | 248/230.4 |
| 5,593,125 A | * | 1/1997 | Storz et al. ............... | 248/316.5 |
| 6,101,684 A | * | 8/2000 | Ginocchio .................. | 24/16 R |
| 6,370,810 B1 | * | 4/2002 | Widerman .................. | 43/21.2 |
| 6,484,375 B1 | * | 11/2002 | Nishida et al. ............. | 24/598.2 |
| 6,561,471 B1 | * | 5/2003 | Hawie ........................ | 248/201 |
| D521,366 S | * | 5/2006 | Polak et al. .................. | D8/383 |
| 7,241,071 B2 | * | 7/2007 | Carraher et al. ............. | 403/164 |
| 7,284,302 B2 | * | 10/2007 | Lares ....................... | 24/16 PB |
| 7,406,795 B1 | * | 8/2008 | Follmar ...................... | 43/21.2 |
| D609,998 S | * | 2/2010 | Radle et al. .................. | D8/396 |

\* cited by examiner

*Primary Examiner*—J. Allen Shriver, II
*Assistant Examiner*—Alaeddin Mohseni
(74) *Attorney, Agent, or Firm*—Jennifer E. Lacroix, Esq.; DLA Piper US LLP

(57) ABSTRACT

Cable support hanger insulators are provided herein that generally have a ratchet locking mechanism to secure an electrical conductor to the insulator. Cable support hanger insulators are provided that have an insulator body, a locking base connected to the insulator body, and a retaining clamp pivotally connected to the insulator body. The insulator body has a seat adapted to receive a conductor cable, a front end, a back end, a first side, and a second side. The locking base has a front plate having a plurality of ratchet teeth. The retaining clamp comprising a first retaining arm, a second retaining arm, and a locking blade.

18 Claims, 3 Drawing Sheets

RATCHET-HEAD CONDUCTOR LOCKING MEDIUM VOLTAGE POLYMER INSULATOR CABLE SUPPORT HANGER MOUNT

RELATED APPLICATIONS

This application claims the benefit of U.S. Provisional Patent Application Ser. No. 60/891,149, filed Feb. 22, 2007, currently pending, the disclosure of which is hereby incorporated by reference in its entirety.

BACKGROUND

The present invention generally relates to a cable hanger support insulator and clamping system. More particularly, the present invention relates to a cable hanger support insulator and clamping system featuring a ratchet locking mechanism to secure an electrical conductor to the insulator.

Electric utilities have previously used many materials for the construction of support hanger mounts used in medium voltage cable supports. These hangar mounts generally have two parts, the insulator and the clamp to secure the cable to the insulator. Further, cable clamps are available in various sizes to accommodate various cable insulation diameters.

BRIEF SUMMARY

Cable support hanger insulators of the present invention generally have a ratchet locking mechanism to secure an electrical conductor to the insulator.

In at least one aspect, a cable support hanger insulator is provided that has an insulator body, a locking base connected to the insulator body, and a retaining clamp pivotally connected to the insulator body. The insulator body has a seat adapted to receive a conductor cable, a front end, a back end, a first side, and a second side. The locking base has a front plate having a plurality of ratchet teeth. The retaining clamp comprising a first retaining arm, a second retaining arm, and a locking blade.

In at least a second aspect, a cable support hanger insulator is provided that has an insulator body, a locking base connected to front end of the insulator body, and a retaining clamp pivotally connected to the socket member that has an open position and a cable engaging position. The insulator body has a seat adapted to receive a conductor cable, a front end, a back end having a socket member, a first side, a second side. The locking base has a front plate having a plurality of ratchet teeth. The retaining clamp has a first retaining arm, a second retaining arm, and a locking blade that extends transversely from the first retaining arm to the second retaining arm. Additionally, the locking blade engages at least one of the plurality of ratchet teeth when the retaining clamp is in the cable engaging position.

In at least a third aspect, a cable support hanger insulator is provided that has an insulator body, a locking base connected to the insulator body, and a retaining clamp pivotally connected to the insulator body that has an open position and a cable engaging position. The insulator body has a seat adapted to receive a conductor cable, a front end, a back end, a first side, and a second side. The locking base has a front plate having a plurality of ratchet teeth. The retaining clamp has a first retaining arm having a guide that engages the front plate of the locking base when the retaining clamp is in the cable retaining position, a second retaining arm that engages the front plate of the locking base when the retaining clamp is in the cable retaining position, and a locking blade that engages at least one of the plurality of ratchet teeth when the retaining clamp is in the cable engaging position.

DETAILED DESCRIPTION

Cable support hanger insulators of the present invention generally have a ratchet locking mechanism to secure an electrical conductor to the insulator. Preferably, the electrical conductors are medium voltage electrical conductors, having a voltage of from about 5 kv to about 35 kv.

Figure 1:
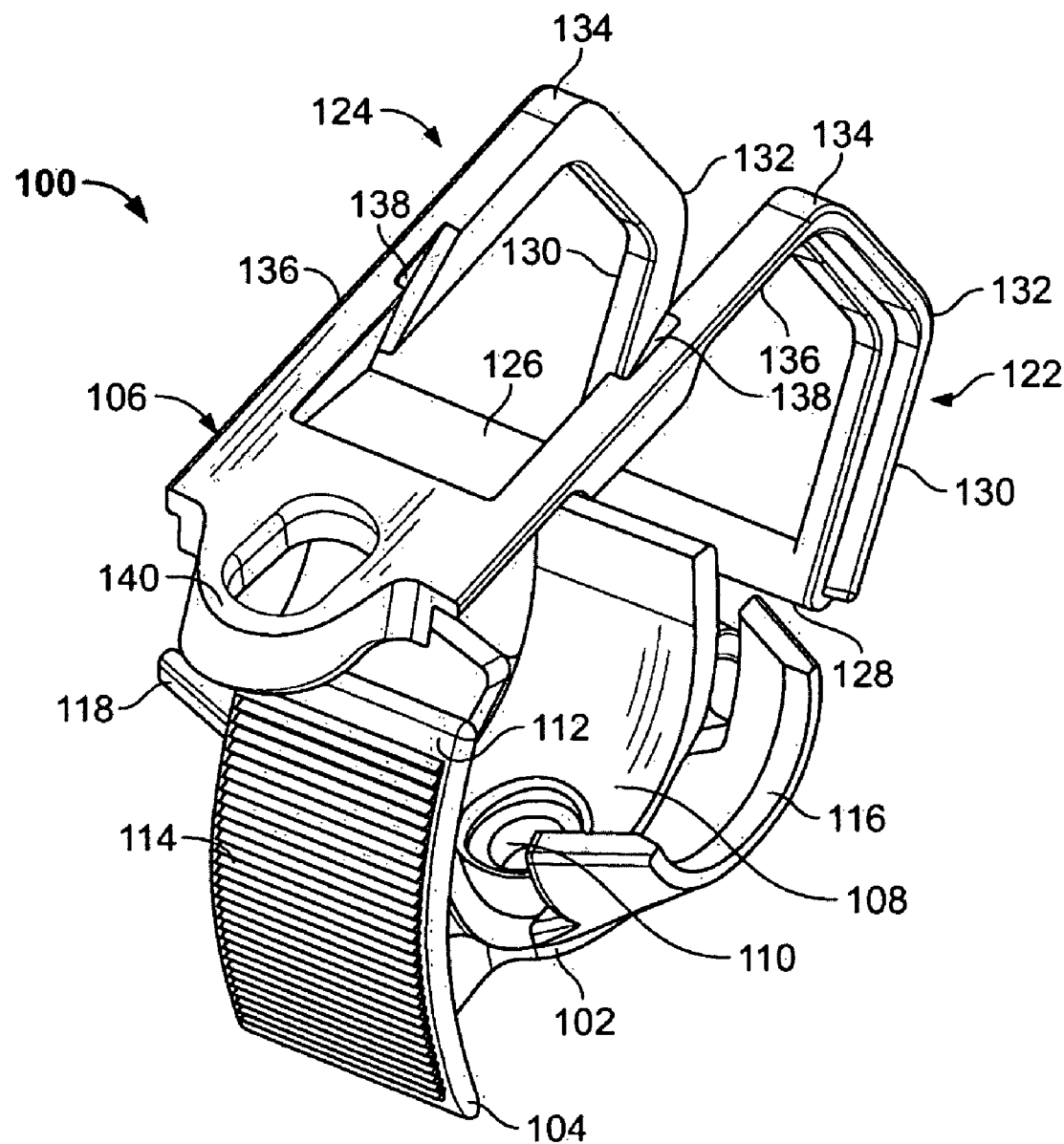
FIG. 1 is an exploded front perspective view of one embodiment of a cable support hanger mount.
Figure 2:
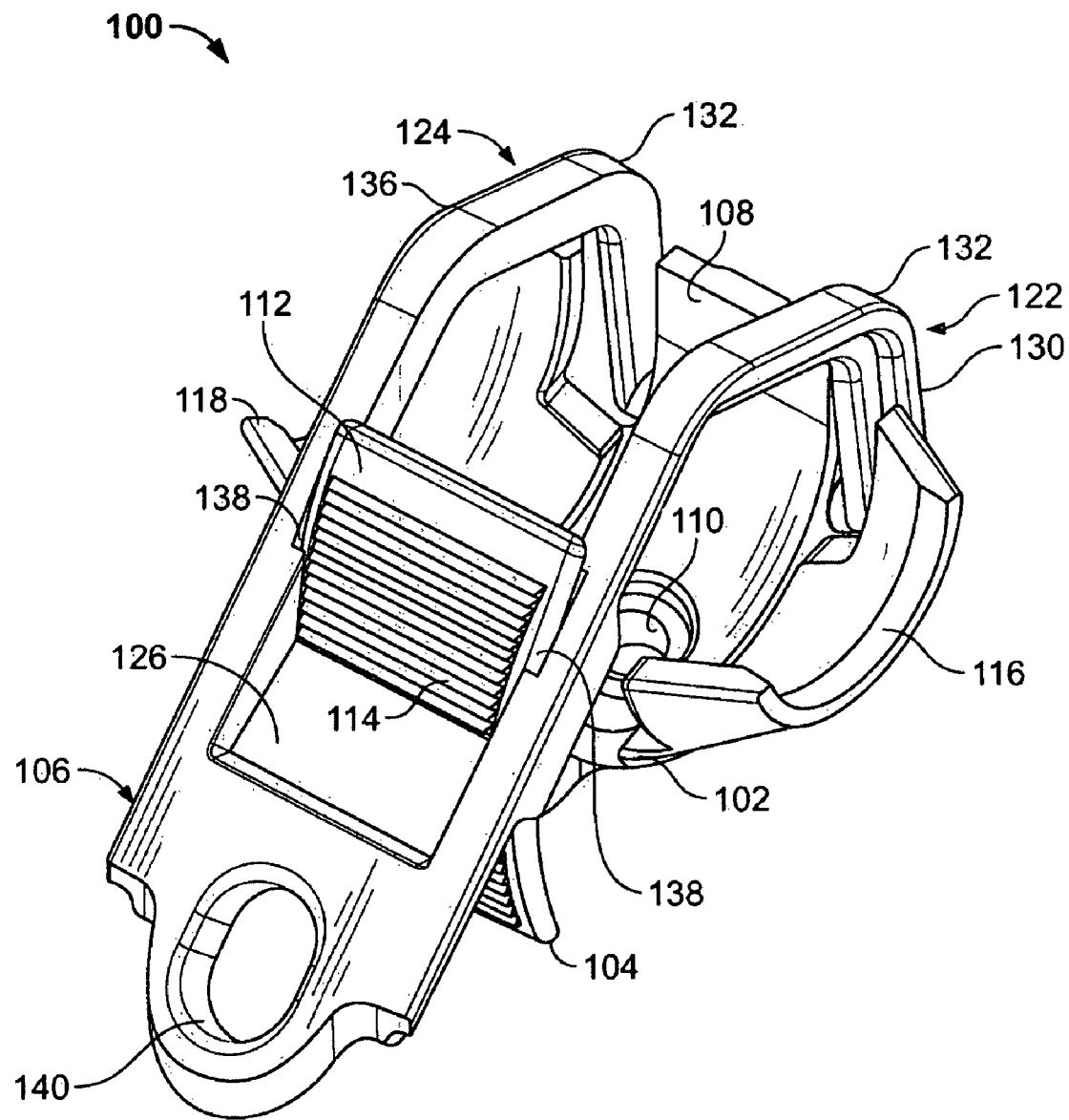
FIG. 2 is a front perspective view of the embodiment of FIG. 1, as assembled in a cable engaging position.
Figure 3:
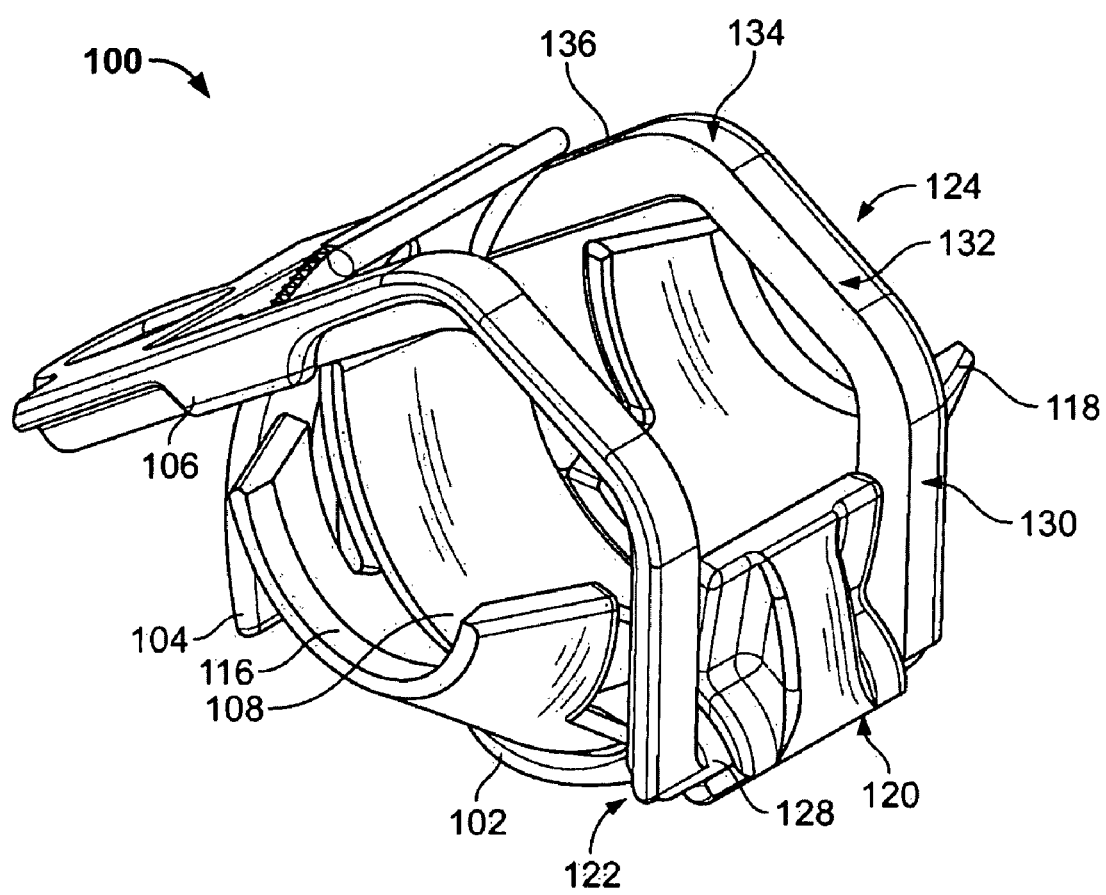
FIG. 3 is a rear perspective view of the embodiment of FIGS. 1 and 2, as assembled in a cable engaging position.

A preferred embodiment of a cable support hanger insulator 100 is illustrated in FIGS. 1-3. Cable support hanger insulator 100 has an insulator body 102, a locking base 104 connected to the insulator body, and a retaining clamp 106 pivotally connected to the insulator body. Cable support hanger 100 also has a first cable support 116 connected to the first side of the insulator body, and a second cable support 118 connected to the second side of the insulator body.

Insulator body 102 has a front end, a back end, a first side, and a second side. Insulator body 102 includes a seat 108, which is adapted to receive a conductor cable placed transversely thereon. Preferably, the seat is concave, having an open curvature from the front end to the back end of the insulator body, so that the conductor cable is received by the curve of the seat. Insulator body 102 can also include a mounting feature, such as fastener hole 110. As illustrated in FIG. 3, insulator body 102 preferably has at least one socket 120 on its back end, which pivotally receives the retaining clamp 106.

Locking base 104 is connected to the insulator body 102. Locking base 104 has a front plate 112. Preferably, locking plate 104 is fixedly connected to the front end of the insulator body 102. Front plate 112 is preferably arcuate, and forms a curve that bows outwardly from the insulator body 102. Front plate 112 has at least one locking feature on its face. Preferably, the locking feature is a plurality of ratchet teeth 114. The plurality of ratchet teeth 114 preferably extends down a substantial portion of the length of the front plate 112. Additionally, each of the ratchet teeth 114 preferably extends transversely across a substantial portion of the width of front plate 112. As illustrated if FIGS. 1 and 2, the ratchet teeth 114 do not extend transversely along the entire width of the front plate 112, such that there is a border area around ratchet teeth 114. Ratchet teeth 114 allow for an adjustable locking engagement between the retaining clamp 106 and the locking base 104, allowing the cable support hanger insulator 100 to be utilized with cables of various diameters.

Retaining clamp 106 is pivotally connected to the insulator body, and is rotatable from an open position to a cable engaging position. The retaining clamp 106 has a first retaining arm 122, a second retaining arm 124, and a locking blade 126. Locking blade 126 extends transversely from, the first retaining arm 122 to the second retaining arm 124, and is connected to both retaining arms. Locking blade 126 is preferably integrally formed with the first and second retaining arms. Locking blade 126 can be arcuate, and preferably has a curve that compliments the curve of the front plate 112. Locking blade 126 of the retaining clamp 106 engages at least one of the ratchet teeth of the locking base when the retaining clamp 106 is in the cable retaining position. Retaining clamp 106 preferably also has a mounting member 128 that is received by, and forms a pivotal connection with, the socket 120 on the back of the insulator body 102. Mounting member 128 can have any suitable configuration, but is preferably a cylindrical bar that extends transversely from the first retaining arm 122 to the second retaining arm 124. Retaining clamp 106 can also include a gripping aperture 140 connected to the first and second retaining arms. Gripping aperture 140 can be used to grip the retaining clamp 106 in order to rotate it from its open position to its cable engaging position. For example, in a preferred embodiment, gripping aperture 140 can be gripped by a hot stick, which can then be used to rotate the retaining clamp downwards from its open position to its cable engaging position.

The retaining clamp 106 is generally arcuate, extending up from the pivotal connection to the back end of the insulator body 102, curving over the insulator body 102, and then extending downwards such that the locking blade 126 can engage the ratchet teeth 114 on the front plate 112 of the locking base 104. The retaining clamp 106 is adapted to engage the surface of a conductor cable positioned in the seat 108 of the insulator body 102.

Each retaining arm comprises a first section 130, a fulcrum section 132 adjacent to the first section 130, a contact section 134 adjacent to the fulcrum section 132, and a second section 136 adjacent to the contact section 134. The fulcrum section 132 comprises a first angle, and the contact section comprises a second angle. The first and second angles can be equal or different. Contact section 134 is preferably configured to center the cable in the seat 108 as the locking blade 126 is moved downward on the ratchet teeth 114 to achieve the cable locking position of the retaining clamp 106. Centering of the cable facilitates the accommodation of cables having various diameters. Preferably, each retaining arm also comprises a guide 138 that engages the front plate of the locking base when the retaining clamp is in the cable retaining position. Each guide 138 is preferably an abutment or groove that engages the front plate 112 to facilitate the maintenance of the locking engagement between the locking blade 126 and the ratchet teeth 114.

Cable supports 116 and 118 are preferably connected to the first and second sides of the insulator body 102, respectively. Cable supports 116 and 118 are preferably concave, and are configured to receive a cable placed transversely across the first cable support 116, the seat 108, and the second cable support 118.

Cable support hanger insulators of the present invention are preferably made from suitable electrically insulating polymers. Examples of suitable electrically insulating polymers include, but are not limited to, thermoplastic materials. Particularly preferred materials include, for example, high density polyethylene (HDPE), epoxies (Cycloaliphatics), and polyurethane. Cable support hanger insulators made from such materials tend to be electrically track resistant and non-breakable. They also tend to be lighter in weight and lower in cost than insulators made from conventional materials. When cable support hanger insulators are made from suitable electrically insulating polymers, any appropriate method of manufacturing the component parts can be utilized, including, for example, injection molding and/or casting.

From the foregoing, it will be appreciated that although specific embodiments of the invention have been described herein for purposes of illustration, various modifications may be made without deviating from the spirit or scope of the invention. It is therefore intended that the foregoing detailed description be regarded as illustrative rather than limiting, and that it be understood that it is the following claims, including all equivalents, that are intended to particularly point out and distinctly claim the subject matter regarded as the invention.

What is claimed is:

1. A cable support hanger insulator comprising:
   an insulator body, the insulator body comprising a seat adapted to receive a conductor cable, a front end, a back end, a first side, and a second side;
   a locking base connected to the insulator body, the locking base comprising a front plate having a plurality of ratchet teeth; and
   a retaining clamp pivotally connected to the insulator body, the retaining clamp comprising a first retaining arm, a second retaining arm, and a locking blade;
   wherein each retaining arm comprises a first section, a fulcrum section adjacent to the first section, a contact section adjacent to the fulcrum section, and a second section adjacent to the contact section.

2. The cable support hanger insulator of claim 1, wherein the front plate of the locking base is arcuate.

3. The cable support hanger insulator of claim 1, wherein the seat is concave.

4. The cable support hanger insulator of claim 1, wherein the fulcrum section comprises a first angle, and the contact section comprises a second angle.

5. The cable support hanger insulator of claim 1, wherein the retaining clamp has an open position and a cable retaining position.

6. The cable support hanger insulator of claim 5, wherein each retaining arm comprises a guide that engages the front plate of the locking base when the retaining clamp is in the cable retaining position.

7. The cable support hanger insulator of claim 1, wherein the locking blade of the retaining clamp engages at least one of the ratchet teeth of the locking base when the retaining clamp is in the cable retaining position.

8. The cable support hanger insulator of claim 1, wherein the body and the retaining clamp each comprise a thermoplastic material.

9. The cable support hanger insulator of claim 1, wherein the body and the retaining clamp each comprise a high density polyethylene, an epoxy, or a polyurethane.

10. The cable support hanger insulator of claim 1, further comprising a first cable support connected to the first side of the insulator body, and a second cable support connected to the second side of the insulator body.

11. The cable support hanger insulator of claim 1, further comprising a gripping aperture connected to the first and second retaining arms.

12. A cable support hanger insulator comprising:
    an insulator body, the insulator body comprising a seat adapted to receive a conductor cable, a front end, a back end having a socket member, a first side, and a second side;
    a locking base connected to front end of the insulator body, the locking base comprising a front plate having a plurality of ratchet teeth; and
    a retaining clamp pivotally connected to the socket member that has an open position and a cable engaging position, the retaining clamp comprising a first retaining arm, a second retaining arm, and a locking blade that extends transversely from the first retaining arm to the second retaining arm;

wherein each retaining arm comprises a first section, a fulcrum section adjacent to the first section, a contact section adjacent to the fulcrum section, and a second section adjacent to the contact section, and the locking blade engages at least one of the plurality of ratchet teeth when the retaining clamp is in the cable engaging position.

13. The cable support hanger insulator of claim 12, wherein the front plate of the locking base is arcuate.

14. The cable support hanger insulator of claim 12, wherein the seat is concave.

15. The cable support hanger insulator of claim 12, wherein each retaining arm comprises a guide that engages the front plate of the locking base when the retaining clamp is in the cable retaining position.

16. The cable support hanger insulator of claim 1, wherein the body and the retaining clamp each comprise a high density polyethylene, an epoxy, or a polyurethane.

17. The cable support hanger insulator of claim 1, further comprising a first cable support connected to the first side of the insulator body, and a second cable support connected to the second side of the insulator body.

18. A cable support hanger insulator comprising:
an insulator body, the insulator body comprising a seat adapted to receive a conductor cable, a front end, a back end, a first side, and a second side;
a locking base connected to the insulator body, the locking base comprising a front plate having a plurality of ratchet teeth; and
a retaining clamp pivotally connected to the insulator body that has an open position and a cable engaging position, the retaining clamp comprising a first retaining arm having a guide that engages the front plate of the locking base when the retaining clamp is in the cable retaining position, a second retaining arm that engages the front plate of the locking base when the retaining clamp is in the cable retaining position, and a locking blade that engages at least one of the plurality of ratchet teeth when the retaining clamp is in the cable engaging position
wherein each retaining arm comprises a first section, a fulcrum section adjacent to the first section, a contact section adjacent to the fulcrum section, and a second section adjacent to the contact section.

* * * * *